United States Patent
Yuan et al.

(10) Patent No.: US 11,245,648 B1
(45) Date of Patent: Feb. 8, 2022

(54) COGNITIVE MANAGEMENT OF CONTEXT SWITCHING FOR MULTIPLE-ROUND DIALOGUES

(71) Applicant: International Business Machines Corporation, Armonk, NY (US)

(72) Inventors: Zhong Fang Yuan, Xi'an (CN); Yuan Yuan Li, Beijing (CN); Yi Ming Wang, Xi'an (CN); Xin Liu, Xi'an (CN); Tong Liu, Xi'an (CN); De Shuo Kong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/944,322

(22) Filed: Jul. 31, 2020

(51) Int. Cl.
  *G06F 15/16* (2006.01)
  *G06F 9/54* (2006.01)
  *H04L 29/06* (2006.01)
  *H04L 12/58* (2006.01)
  *G06N 20/00* (2019.01)
  *G06N 5/02* (2006.01)

(52) U.S. Cl.
  CPC ........... *H04L 51/02* (2013.01); *G06N 5/02* (2013.01); *G06N 20/00* (2019.01)

(58) Field of Classification Search
  CPC .......... H04L 51/02; G06N 20/00; G06N 5/02
  USPC ...................................................... 709/206
  See application file for complete search history.

(56) References Cited

U.S. PATENT DOCUMENTS

| | | | |
|---|---|---|---|
| 7,702,500 B2* | 4/2010 | Blaedow | G06F 40/40 704/9 |
| 7,783,486 B2* | 8/2010 | Rosser | G10L 15/22 704/270 |
| 10,733,982 B2* | 8/2020 | Grupen | G06F 40/35 |
| 2016/0217784 A1* | 7/2016 | Gelfenbeyn | G06F 3/04842 |
| 2017/0180499 A1* | 6/2017 | Gelfenbeyn | H04L 51/02 |
| 2017/0357632 A1* | 12/2017 | Pagallo | G06F 3/04886 |
| 2017/0357716 A1* | 12/2017 | Bellegarda | G06F 3/16 |
| 2018/0004729 A1 | 1/2018 | Qiu et al. | |
| 2018/0150143 A1* | 5/2018 | Orr | G06F 40/216 |

(Continued)

FOREIGN PATENT DOCUMENTS

| | | |
|---|---|---|
| CN | 106448670 A | 2/2017 |
| CN | 107766506 A | 3/2018 |

(Continued)

OTHER PUBLICATIONS

Chen, et al. "A Survey on Dialogue Systems: Recent Advances and New Frontiers", Nov. 2017.

(Continued)

*Primary Examiner* — Hamza N Algibhah
(74) *Attorney, Agent, or Firm* — Patterson + Sheridan, LLP

(57) ABSTRACT

In embodiments, a method includes receiving a first user input to a chat managed by a multiple-round dialogue system, receiving a second user input to the chat, the second user input following the first user input, and embedding the first and second user inputs into first and second nodes, respectively, each node including a multi-dimensional vector. The method further includes determining, based at least in part on the first node and the second node, if a context of the second user input is the same as a context of the first user input, and, based on the determination, generating a chat reply to the second user input.

20 Claims, 10 Drawing Sheets

(56) References Cited

U.S. PATENT DOCUMENTS

| | | | | |
|---|---|---|---|---|
| 2018/0285778 A1* | 10/2018 | Nori | ................... | G06K 9/6282 |
| 2019/0042988 A1* | 2/2019 | Brown | ................ | G06F 16/9535 |
| 2019/0156206 A1* | 5/2019 | Graham | ............... | G06N 3/0454 |
| 2019/0213999 A1* | 7/2019 | Grupen | ............... | H04M 3/4936 |
| 2020/0320982 A1* | 10/2020 | Larson | ................... | G10L 15/07 |
| 2020/0342850 A1* | 10/2020 | Vishnoi | .................. | H04L 51/02 |
| 2020/0387675 A1* | 12/2020 | Nugent | .................. | G06F 40/40 |
| 2021/0082410 A1* | 3/2021 | Teserra | ................... | G06F 40/30 |
| 2021/0082424 A1* | 3/2021 | Johnson | ............... | G06K 9/6256 |
| 2021/0097140 A1* | 4/2021 | Chatterjee | ............ | G06F 16/332 |
| 2021/0117214 A1* | 4/2021 | Presant | .................. | G06Q 50/01 |
| 2021/0141862 A1* | 5/2021 | Huang | .................. | G06N 5/043 |
| 2021/0144107 A1* | 5/2021 | Liang | .................... | G06F 40/216 |
| 2021/0150155 A1* | 5/2021 | Kim | ...................... | G06F 40/30 |
| 2021/0168096 A1* | 6/2021 | Miranda | ................ | G06N 3/084 |
| 2021/0173829 A1* | 6/2021 | Zeng | ..................... | G06F 16/243 |
| 2021/0174798 A1* | 6/2021 | Wu | ...................... | G06K 9/6257 |
| 2021/0217408 A1* | 7/2021 | Hakkani-Tur | .......... | G10L 15/16 |
| 2021/0224275 A1* | 7/2021 | Maheshwari | ........ | G06N 3/0445 |
| 2021/0224660 A1* | 7/2021 | Song | ..................... | G06F 40/284 |

FOREIGN PATENT DOCUMENTS

| | | |
|---|---|---|
| CN | 108197191 B | 11/2018 |
| CN | 108829667 A | 11/2018 |
| CN | 109308320 A | 2/2019 |
| CN | 109635085 A | 4/2019 |

OTHER PUBLICATIONS

Eshghi, et al. "What is Conversation? Distinguishing Dialogue Contexts", 2009.

Jurafsky, et al., Dialog Systems and Chatbots (Chapter 24) from Speech and Language Processing, 2018.

* cited by examiner

Next Node Training: One parent node:

Next Node Training: Two parent nodes

Next Node Training: Three parent nodes:

COGNITIVE MANAGEMENT OF CONTEXT SWITCHING FOR MULTIPLE-ROUND DIALOGUES

BACKGROUND

The present invention relates to multi-round dialogue systems, and, more specifically, to cognitive management of context switching for multiple-round dialogues using conversation sequence information.

Dialog systems, also known as "chatbots", assist users to access information conveniently, and finish tasks efficiently. Current dialog systems are generally adept at retrieving an answer for a single round of user questions, but for a lengthy dialog with multiple-rounds of user questions or inputs, each requiring a response, dialog systems are often unable to understand changes in a context of a user's inputs across multiple-rounds.

The conventional method of acquiring context in a dialog involves a predetermined sequence of steps, and still depends significantly on manual interaction by a human. For example, in some multiple-round dialogue applications, relative experts are engaged to configure a dialog process, which has high labor costs. The challenge is how to automatically determine context in a multiple-round dialog in a way that does not require or depend upon manual configuration of the dialog process in a specific domain.

It is thus desirable to provide solutions to these drawbacks of conventional multiple-round dialogue systems.

SUMMARY

According to one embodiment of the present invention, a method is provided. The method includes receiving a first user input to a chat managed by a multiple-round dialogue system, and receiving a second user input to the chat, the second user input following the first user input. The method further includes embedding the first and second user inputs into first and second nodes, respectively, each node including a multi-dimensional vector, and determining, based at least in part on the first node and the second node, if a context of the second user input is the same as a context of the first user input. The method still further includes, based on the determination, generating a chat reply to the second user input.

According to another embodiment of the present invention, a system is provided. The system includes a user interface, configured to receive first and second user inputs to a multi-round dialog system, the second user input following the first. The system further includes a context analyzer, coupled to the user interface, configured to embed the first user input into a first node and the second user input into a second node, each node including a multi-dimensional vector, and determine, based at least in part on the first and second nodes, if a context of a second user input is the same as a context of the first user input. Finally, the system still further includes a reply generator, coupled to an output of the context analyzer, configured to, based at least in part on the determination, generate a reply to the second user input.

According to yet another embodiment of the present invention, a computer program product for context switching management system for multi-round dialogues is provided. The computer program product includes a computer-readable storage medium having computer-readable program code embodied therewith, the computer-readable program code executable by one or more computer processors to receive a first user input of a multiple-round dialogue and to receive a second user input of the multiple-round dialogue, the second user input following the first user input. The computer-readable program code is further executable by the one or more processors to embed the first user input into a first node and the second user input into a second node, each node including a multi-dimensional vector, and determine, based at least in part on the first node and the second node, if a context of the second user input is the same as a context of the first user input. The computer-readable program code is further executable by the one or more processors to, based on the determination, generate a reply to the second user input.

DETAILED DESCRIPTION

Figure 1:
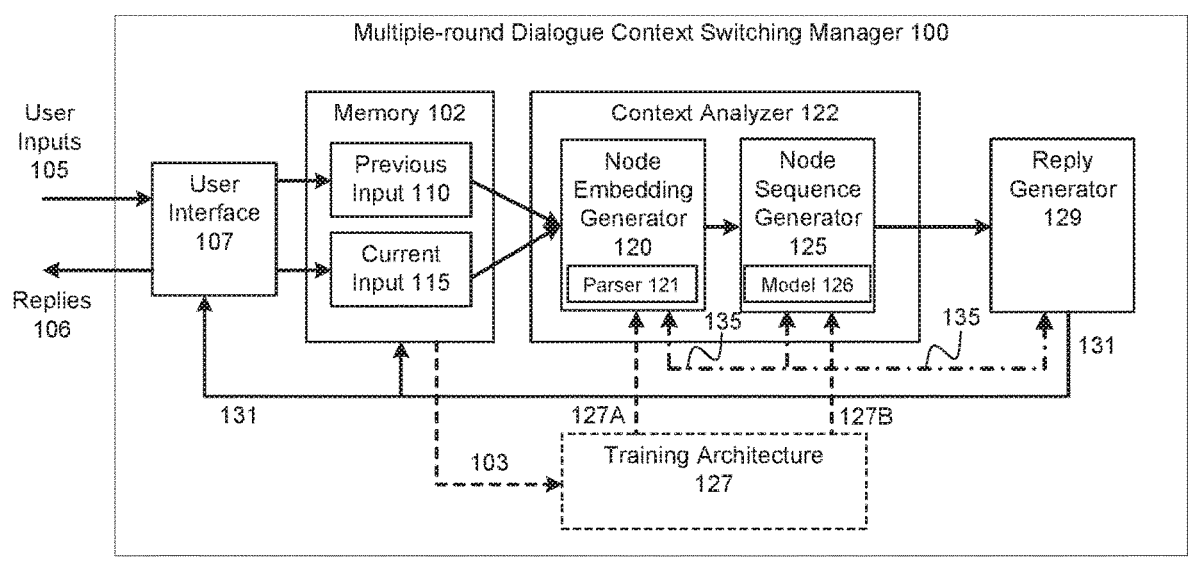
FIG. 1 illustrates a schematic drawing of an example system, according to one embodiment disclosed herein.

Embodiments and examples described herein relate to dialogue systems, known as "chatbots." A chatbot is an automated system that conversationally interacts with users. In particular, the embodiments and examples described herein relate to multi-round dialogue systems, where a user may converse with the chatbot on various topics over multiple dialogue rounds. The context of any two consecutive rounds in a sequence of rounds of a multi-round dialogue may be partially related to each other, or, for example, may not be related to each other at all. For example, there may be a chatbot hosted by an automobile dealership. The chatbot may handle all sorts of potential buyer inquiries, and even handle most, or even all, aspects of an online sales transaction.

For example, as described in detail below with reference to FIG. 5, a potential customer of a luxury automobile may be involved in a chat with an online chatbot maintained by a Mercedes-Benz dealership located in the greater Miami, Fla. area. The user may be anywhere in South Florida, for example, looking for a good online deal. The user may provide a succession of inputs to the conversation, and receive corresponding responses from the chatbot, where an input is understood to mean a question, a comment or any other locution that may be uttered in normal human conversation. Accordingly, for example, the user may first state "Hello, I wish to buy a car." He or she may then say "You know, I think a Mercedes is the best car for me, like the 300C red one I see here on your web page", and further continue with the question: "Can I buy that car for less than $30,000?" Each of these user inputs has the same context, which one may characterize as "buy car." The chatbot may identify the context upon receiving the first user input, and may continue to respond to the user as long as this original context of "buy car" persists. However, at some point in the conversation the user may ask, as users often do in human conversation, an unrelated query such as "How is the weather in Miami?" At his precise moment the context "buy car" is no longer valid, and a new context must be identified. If the chatbot does not recognize that the context has changed, it may provide a nonsensical answer, damaging the reputation of the business, and frustrating the user.

Thus, a multi-round dialogue chatbot must always understand the context of a user input. It must comprehend if a subsequent user input in a chat addresses the same context as the user's previous input, or whether the user has switched topics, and thus the context has changed. Being a chatbot, however, it cannot know for how many subsequent user inputs a given context will be valid. Thus, in accordance with one or more embodiments, a context switching manager of the chatbot may check, each time a new user input is received, whether or not the context of the current user input is the same as that of the previous user input.

Accordingly, various examples disclosed herein described automatic management of context switching in multiple-round dialogue chatbots. In one example, an example multiple-round dialogue context switching manager receives a first user input to a chat, responds to it, and subsequently receives a second user input to the chat. The manager respectively converts the first and second user inputs into first and second nodes. Each node is a numerical representation of intent and, one or more entities parsed from the user input, and, if available, a chatbot generated reply to a user input. Each node may include a multi-dimensional vector, each dimension being a numerical representation of, for example, the intent, one of the entities, or the reply. Based on the two nodes, and using a trained node-sequencing model, the context switching manager determines if a context of the second user input (e.g., buy car") is the same as a context of the first user input (e.g., "buy car"). The method still further includes, based on the determination, generating a chat reply to the second user input, reflecting the now determined context of the second user input. In some examples, a tentative reply to the second user input is known, and when that is the case, that tentative reply is also included in the second node. An example system, including an example context switching manager, is next described.

FIG. 1 illustrates a schematic drawing of an example system, according to one embodiment disclosed herein. With reference to FIG. 1 there is shown a multiple-round dialogue context switching manager 100. Multiple-round dialogue context switching manager 100 includes a user interface 107, which both receives user inputs 105 from, and returns replies 106 to, a user. On receiving a user input 105, user interface 107 forwards it to memory 102 which stores at least the previous user input 110 as well as the current user input 115, as shown. In one or more embodiments, the memory 102 may store a pre-defined number of previous user inputs, or, for example, all user inputs, which may be used in further training of each of the elements of the context analyzer 122, described more fully below.

From memory 102 each of the previous user input 110 and the current user input 115 are provided to context analyzer 122. Context analyzer 122 processes each input into a node, and then analyzes the two nodes to determine whether the context has changed, or remained the same. Context analyzer thus includes node embedding generator 120, which includes parser 121. For each input by the user, parser 121 performs intent recognition and entity recognition operations in order, and generates the intent of each user input and a set of entities for each input. In one or more embodiments, parser 121 includes at least two models, an intent recognition model and an entity recognition model, which respectively obtain an intent, and several entities for each user input. Node embedding generator 120 then adds to this intent and entity data the reply to each user input, if available. Generally, a reply from the previous user input 110 is available, as it has relatively recently been generated and stored in memory 102, together with previous input 110. However, as regards a current user input, because the chatbot has not yet generated a reply to the current user input 115, no reply may be available.

Figure 6:
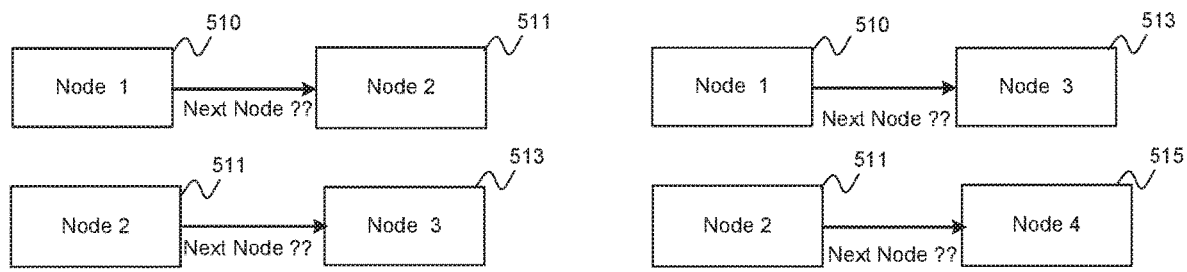
FIG. 6 depicts example next node predictions based on example one node and two node inputs, respectively, according to one embodiment disclosed herein.
Figure 6:
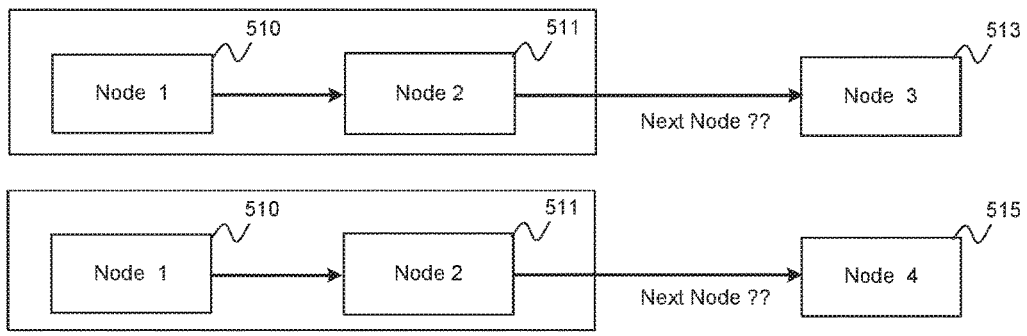
Figure 7:
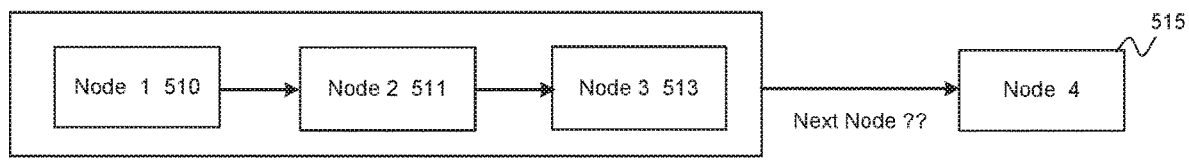
FIG. 7 depicts an example next node prediction based on an example three node sequence, according to one embodiment disclosed herein.

In alternate embodiments, however, the current user input 115 may be prematurely, or provisionally, forwarded from node embedding generator 120 to reply generator 129 anyway, over, for example, optional link 135, shown in half dash-dot lines, before the current user input 115 is actually embedded in a node, under certain circumstances. This may occur, for example, in two scenarios. A first such scenario is where it is assumed, or even predicted (e.g., from node sequencing), that the context has not changed, so that a tentative reply to the current user input 115, which assumes the same context as for the previous user input 110, would be a good reply. A second scenario is one where the context may have changed somewhat, but the current user input is nonetheless a node that is predicted to next occur in a sequence of N nodes, even if it has a different context, as shown in FIGS. 5-7 and described in detail below. In this second scenario a reply is also tentatively generated assuming that the node prediction for the current input 115 is accurate. In this second example scenario, the node sequencing model 126 is used to generate a prediction, based on the previous, the last two, or the last three previous nodes (including previous input 110's node), and this prediction is also sent to the reply generator 129 prior to the node embedding generator 120 finalizing the node for the current user input 115. Thus, optional link 135 also connects node sequence generator 125 to node embedding generator 120, and to reply generator 129, in a three way connection for communications and data passing regarding generating such provisional replies. As an illustrative example of this second example scenario, with reference to FIG. 7, the current user input 115 may have the context of Node 4 in FIG. 7, and Node 4 may also be known to be the next node following the Node 1-Node 2-Node 3 sequence. As a result, the node sequence generator 125 can readily guess that Node 4 is the next node, and reply generator 129 may, for example, on the basis of that prediction, generate a tentative reply to the current user input 115 before node embedding generator actually embeds the current user input 115 in a node. Once, for example, the tentative reply from reply generator 129 is obtained to, in the above example, the presumed Node 4 associated with the current user input 115, that reply may then be added to the current node, and both nodes forwarded to node sequence generator 125 to formally determine whether a context shift has occurred.

Thus, in such alternate embodiments the tentative reply obtained from reply generator 129 is added to the intent and several entities for the current input 115 for embedding into a current node.

In either case, whether or not a reply is available for the current user input or not, for each user input, the intent, entity and, to the extent available, reply data, is respectively embedded into a node by the node embedding generator 120, and the two nodes, namely the previous input node and the current input node, are then provided to the node sequence generator 125, which includes one or more node sequencing model(s) 126, which, having been appropriately trained (as described more fully below), determine whether or not the context of the two nodes is the same, or has changed.

It is noted that further details of node embedding generator 120 are described below with reference to FIGS. 3A and 3B, and further details of node sequence generator 125, and how node sequencing model(s) 126 are trained, are described below with reference to FIGS. 4A and 4B, and FIGS. 5-7. As noted, once the previous input node and the current input node have been generated, node sequence generator 125 determines if the context has changed, or not, between them. This determination is then provided to reply generator 129, which, in turn, generates a context appropriate reply, and forwards it, over link 131, to user interface 107 and also to memory 102. User interface 107 provides the reply to the user, and memory 102 may store the reply, along with several other previous rounds of user inputs and replies in the chat, for use in further training of the two elements of context analyzer 122. This is because the several rounds of chat data indicate what succession of inputs actual users submit to the chat, and, from each user's reaction to a given reply (e.g., as determined from the next user input following the reply), whether the context switching manager 100 accurately seized context. Thus, in some embodiments, multiple-round dialogue context switching manager 100 may also include training architecture 127, configured to use chat data from several rounds of user inputs and corresponding replies thereto, from several different users, all obtained from memory 102 and used to train both node embedding generator 120 as well as node sequence generator 125.

Continuing with reference to FIG. 1, in one example, a previous user input 110 may be the query "I want to purchase an automobile", which is then followed by a current user input 115 which is the query "How is the weather in Xi'an?" In this example, using the context analyzer 122, the multiple-round dialogue context switching manager 100 recognizes a different context for the current user input, and thus determines that the current context, which may be called "weather inquiry", for example, is not the same as the previous context of "buy car." Based on this automatic recognition of a change in context, which is communicated by context analyzer 122 to reply generator 129, reply generator 129 is used to generate an appropriate reply to the current user input (query, in this example) 115, and forward the reply to user interface 107, which then outputs it to the user.

Figure 2:
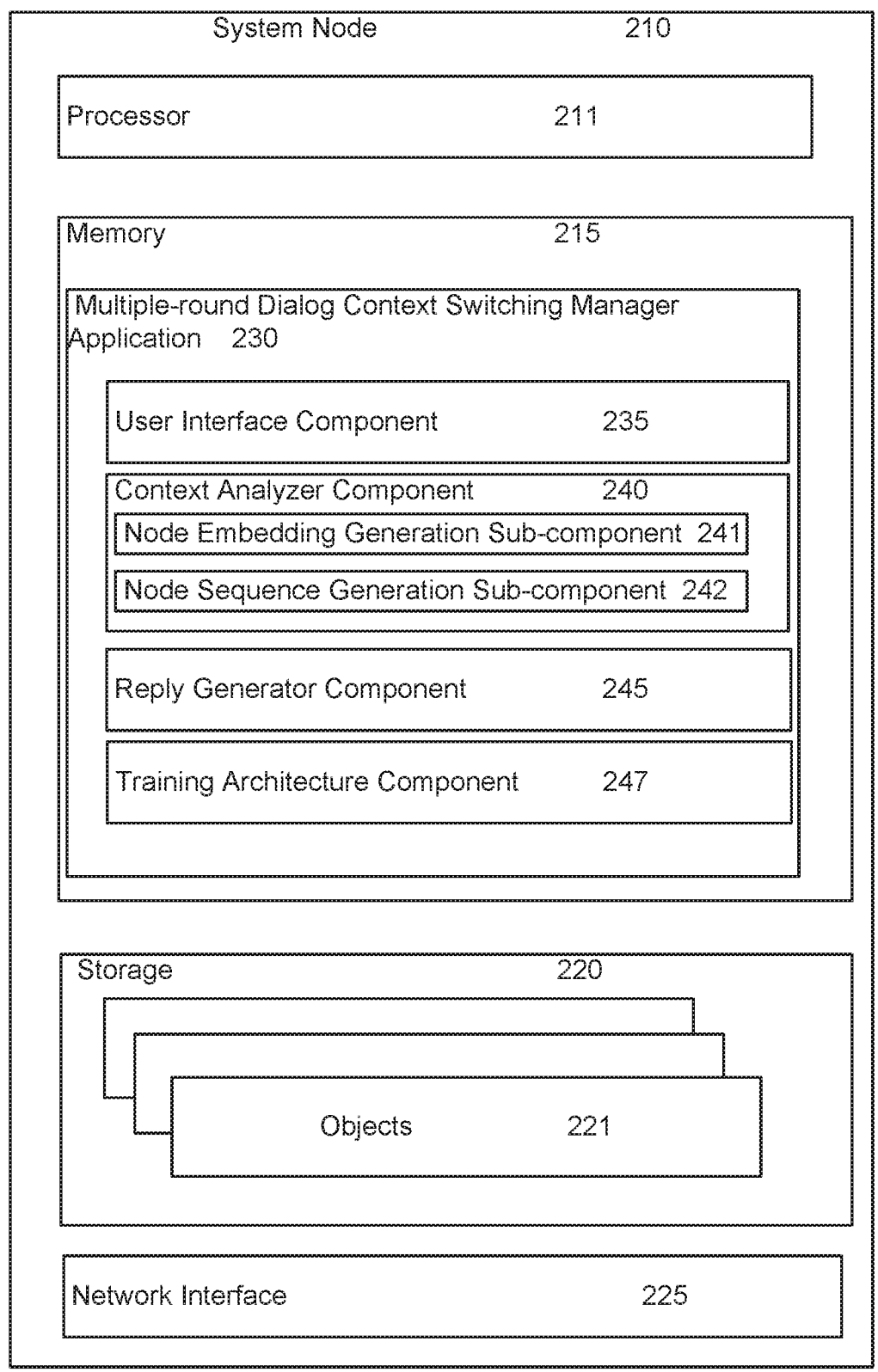
FIG. 2 is a block diagram illustrating a system node configured to provide cognitive multi-task orchestration of dialogues, according to one embodiment disclosed herein.

FIG. 2 is a block diagram illustrating a System Node 210 configured to provide multiple-round dialogue context switching management, according to one embodiment disclosed herein. System Node 210 is equivalent to the multiple-round dialogue context switching manager 100 schematically depicted in FIG. 1, but without showing in FIG. 2 all of the elements of the context switching manager, and all of the internal and external communications pathways that are shown in FIG. 1.

In the illustrated embodiment, the System Node 210 includes a Processor 211, Memory 215, Storage 220, and a Network Interface 225. In the illustrated embodiment, the Processor 211 retrieves and executes programming instructions stored in Memory 215, as well as stores and retrieves application data residing in Storage 220. The Processor 211 is generally representative of a single CPU, multiple CPUs, a single CPU having multiple processing cores, and the like. The Memory 215 is generally included to be representative of a random access memory. Storage 220 may be disk drives or flash-based storage devices, and may include fixed and/or removable storage devices, such as fixed disk drives, removable memory cards, or optical storage, network attached storage (NAS), or storage area network (SAN). Storage 220 may include one or more data bases, including independent auxiliary storage pools (IASPs). Via the Network Interface 225, the System Node 210 can be communicatively coupled with one or more other devices and components, such as other System Nodes 210, database nodes (storing, for example, chatbot data including many rounds of user inputs and replies for a multitude of users, for analysis and training purposes), monitoring nodes, storage nodes, and the like.

In the illustrated embodiment, the Storage 220 includes a set of Objects 221. Although depicted as residing in Storage 220, in embodiments, the Objects 221 may reside in any suitable location. In embodiments, the Objects 221 are generally representative of any data (e.g., application data, saved files, databases, and the like) that is maintained and/or operated on by the System Node 210. Objects 221 may include one or more databases, such as, for example a database to store raw data comprising <intent, entity> pairs, as used by a parser sub-component of the Node Embedding Generation Sub-Component 241, described in detail below. Objects 221 may also include one or more deep learning based predictive models, embodied as, for example, one or more artificial neural networks (ANNs), one or more convolutional neural networks (CNNs), one or more recurrent neural networks (RNNs), or the like, which are first trained to, and then used by Node Embedding Generation Sub-Component 241 to determine an intent and several entities for each user input. Additionally, objects 221 may also include one or more deep learning based predictive models, embodied as, for example, one or more artificial neural networks (ANNs), one or more convolutional neural networks (CNNs), one or more recurrent neural networks (RNNs), one or more Bi-directional long short term memories (B-LSTMs), which may be a type of RNNs, or the like, which are first trained to, and then used by Node Sequence Generation Sub-component 242 to determine whether or not a given node, or sequence of nodes, predicts a next node, and thus whether that next node shares a context with the current user input's associated node, or not. Objects 221 may also include training data, which may include, for example, a large number of past chats, for several different users, that were stored in Storage 220 after each chat was completed, used by Training Architecture Component 247 to train the one or more deep learning models described above. As illustrated, the Memory 215 includes a Multiple-round Dialog Context Switching Manager Application 230. Although depicted as software in Memory 215, in embodiments, the functionality of the Multiple-round Dialog Context Switching Manager Application 230 can be implemented in any location using hardware, software, firmware, or a combination of hardware, software and firmware. Although not illustrated in FIG. 2, the Memory 215 may further include any number of other applications used to create and modify the Objects 221 and perform system tasks on the System Node 210.

As illustrated, the Multiple-round Dialog Context Switching Manager Application 230 includes a User Interface Component 235, a Context Analyzer Component 240, a Reply Generator Component 245, and a Training Architecture Component 247. The Context Analyzer Component 240 includes two sub-components, the Node Embedding Generation Sub-component 241, and the Node Sequence Generation Sub-component 242. Although depicted as discrete components and sub-components for conceptual clarity, in embodiments, the operations and functionality of the User Interface Component 235, Context Analyzer Component 240, including Node Embedding Generation Sub-component 241, and the Node Sequence Generation Sub-component 242, Reply Generator Component 245, and Training Architecture Component 247, if implemented in the System Node 210, may be combined, wholly or partially, or distributed across any number of components or sub-components. In an embodiment, the Multiple-round Dialog Context Switching Manager Application 230 is generally used to seize context manage or orchestrate the provision of a response to a user query to a virtual assistant, an automated dialogue system, or the like, by selecting a best response from one of a set of chatbots. In an embodiment, the Multiple-round Dialog Context Switching Manager Application 230 is also used to train, via the Training Architecture Component 247, the one or more deep learning predictive models that determine, in real time, whether the current node has a different context than the previous node, and if the context has in fact changed, what that new context is. Using the newly "seized" context, as it is known, sometimes referred to herein as the "current dialog state", the Reply Generator Component 245 then generates an appropriate reply to the user's current query or comment.

In an embodiment, the User Interface Component 235 is used to generate and output user interfaces (UIs), which may include graphical user interfaces (GUIs) for users, in which users may type, or even speak a user input, and in which, or through which, a reply to the user may be provided. In one embodiment, users can use the User Interface Component 235 to chat with a multiple-round dialog chatbot managed by the Multiple-round Dialog Context Switching Manager Application 230, including to input questions to it and to receive replies to those questions from it, such as, for example, in multiple rounds of one or more online conversations. Thus, in some embodiments, the displayed UI includes an entire conversation between the user and an example multiple-round dialogue chatbot, and in others it may only display a predefined recent portion of the conversation.

In the illustrated embodiment, the Context Analyzer Component 240 receives information from the UI Component 235 for each of a previous user input and a current user input, and respectively embeds each user input, and a reply generated for it when available (as described above), in a node. In the illustrated embodiment, this aspect of the Context Analyzer Component's workload is handled by the Node Embedding Generation Sub-component 241. Once the two respective nodes have been generated, they are then passed to the Node Sequence Generation Sub-component 242 to determine their contextual relationship. The two nodes as passed to the Node Sequence Generation Sub-component 242 are vectors that are output by the Node Embedding Generation Sub-component 241. In the illustrated embodiment, the contextual relationship between the two respective nodes, and thus, whether they share a context, or a new context has arisen, may be determined by a trained model of the Node Sequence Generation Sub-component 242 that recognizes relationships between a first node and a current node, or between several nodes in a sequence and a final node in the sequence, as described in detail below, with reference to FIGS. 5-7. Once the context of the current user input is known, the Context Analyzer Component 240 passes that information to the Reply Generator Component 245, which generates a reply to the user's current input. The reply is then provided to the user via the User Interface Component 235. In embodiments, the node sequence model used to predict the context of the current user input may trained by the Training Architecture Component 247 of Multiple-round Dialog Context Switching Manager Application 230, based on, for example, one or more sets of multiple-round chat data stored as Objects 221 in Storage 220.

In embodiments, System Node 210 may communicate with both users as well as other computing nodes, such as, for example, other computing nodes located in the cloud, or at remote locations, via Network Interface 225.

Figure 3A:
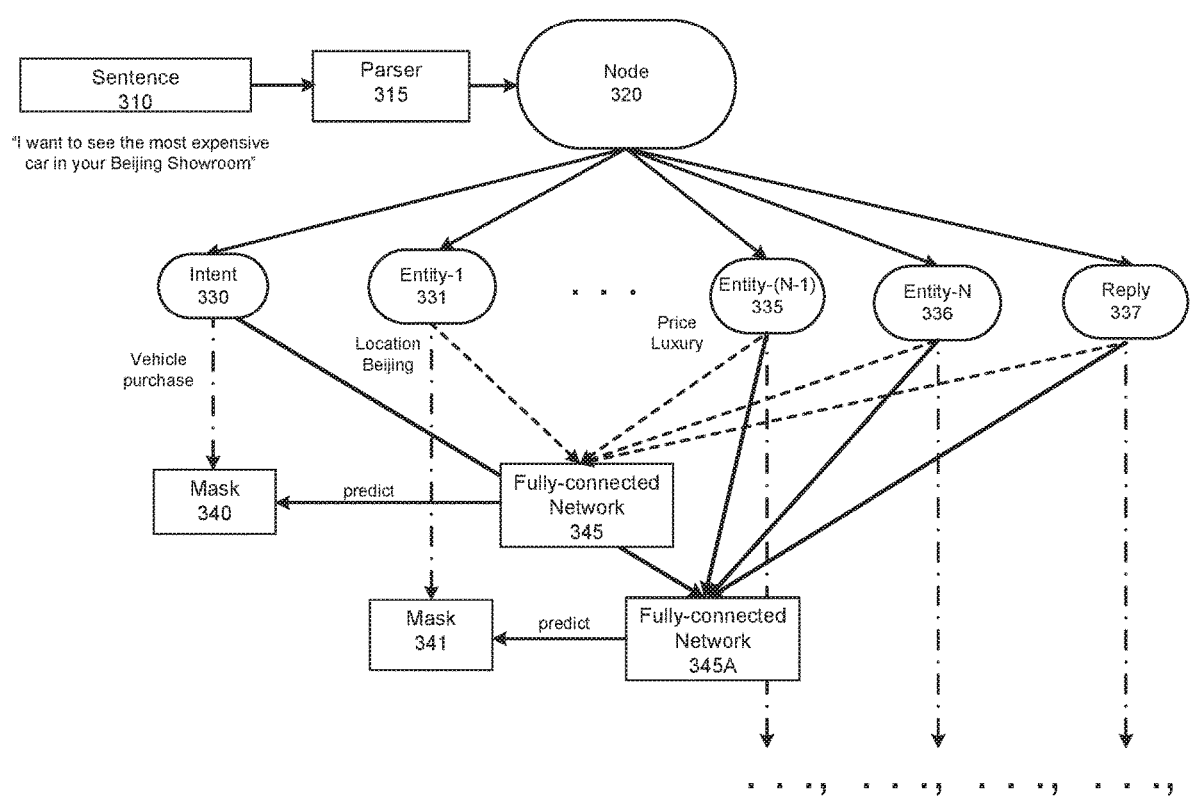
FIG. 3A illustrates an example node-embedding process, according to one embodiment disclosed herein.
Figure 3B:
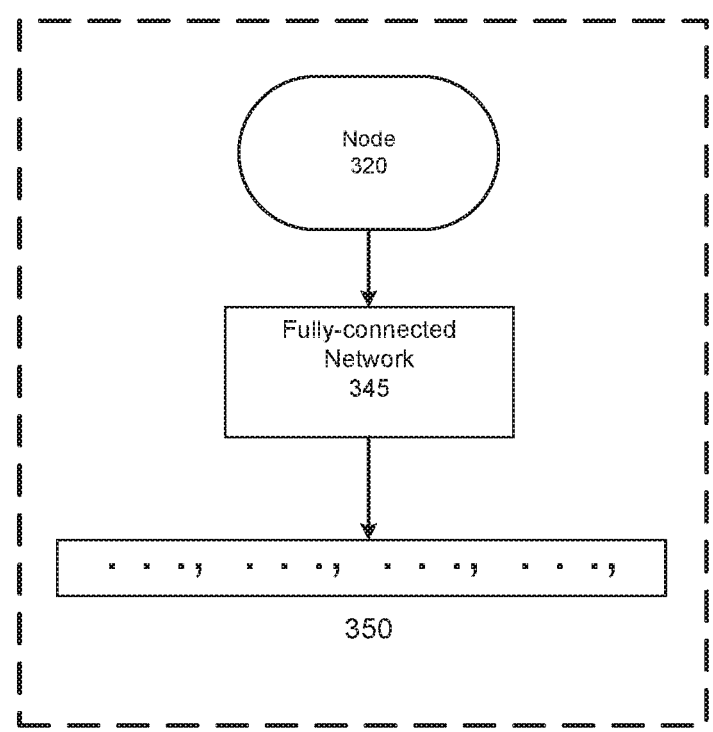
FIG. 3B illustrates an overview of the example node-embedding process of FIG. 4A, according to one embodiment disclosed herein.

FIGS. 3A and 3B, next described, illustrate an example node-embedding process, according to one embodiment disclosed herein. In FIG. 3A, an entire node embedding process is illustrated, and in FIG. 3B an overview of the node embedding process is illustrated. With reference to FIGS. 3A and 3B, it is noted that dialogue node embedding allows for the representation of intent and entity information from one round of dialogue in a numerical form, as components of vector 350.

Continuing with reference to FIG. 3A, there is shown an example sentence 310 to be processed. Sentence 310 is a user input, either previous or current, that is to be embedded into a node by the node embedding generator, such as, for example, node embedding generator 120 of FIG. 1, or, for example, Node Embedding Generator Sub-component 241, of Context Analyzer Component 240, of FIG. 2. As noted above, a node refers to a vector with several components, each component being a number. Thus, in one or more embodiments, the node vector 350, which is the output of the node embedding generator, is an array of numbers, where each number is a numeric representation of the intent 330, entities 331-336, and if available, a reply 337 to the user input associated that included sentence 310. Thus, as is illustrated in FIG. 3A, in one or more embodiments, example sentence 310 is fed to parser 315, which generates the individual (intent, entity) components of node 320. Parser 315 does this by obtaining the intent and entities for sentence 310. In order to obtain the intent 330 and entities 331-336, in one or more embodiments, parser 315 includes an intent recognition model and an entity recognition model (not shown). For each statement input by the user, intent recognition and entity recognition operations are performed in order.

As an example, as shown in FIG. 3A, sentence 310 may be the user input "I want to see the most expensive car in your Beijing showroom." Parser 315 may process the sentence 310 to obtain the intent 330 of the example sentence 310 to be "vehicle purchase", and the entities to include "location: Beijing" 331, "price: luxury" 335, and other entities, as shown. In one or more embodiments, each of these is reduced to a number and made one component of node 350.

As noted above, when available, a reply to a user input is also embedded in the node. Thus, the node includes reply 337 whenever available. Continuing with reference to FIG. 3A, there is also illustrated a masking technique that may be used, in one or more embodiments, to train the model(s) of an example node embedding generator to, when parsing intents and entities from a user input, to consider the entire set of intent+entities in a holistic manner. Thus, as shown in FIG. 3A, the node embedding generator is trained by having it predict masked elements with other elements of the node by randomly hashing some node elements. As shown in FIG. 3A, fully connected network 345 is given all of the entities, for example entity-1 331 through entity-N 336, as well as the reply 337 to the user input, and trained to, from that data, predict the intent 330, which is masked for this exercise, as shown at "mask" 340. Similarly, a later iteration (after one or more rounds of training) of the fully connected network 345A, is given the intent 330, all but one of the entities, masking entity-1 331, and reply 337, and trained to predict entity-1 331, shown as "mask" 341. In a runtime application, of course, no nodes are masked.

As shown in FIG. 3A, a numeric representation of each of intent 330, entities 331-336, and reply 337 are embedded in node 350.

FIG. 3B illustrates an overview of the node embedding process illustrated in detail in FIG. 3A. With reference to FIG. 3B, node 320 is transformed by fully-connected network 345 into node 350, which is a multi-dimensional vector having several components, each a number. The various components are shown as separated by commas in the nodal representation 350 of FIG. 3B. As noted above, in one or more embodiments, the two respective nodes for a previous input and a current input are provided to a node sequence generator, which uses a node sequence model to predict a subsequent node of the previous node, in accordance with various embodiments. The node sequence generator may be, for example, node sequence generator 125, as shown in FIG. 1, and may use, for example, one or more node sequence models 126, also shown in FIG. 1. Or, for example, the node sequence generator may be Node Sequence Generation Sub-component 242 (of Context Analyzer Component 240), as shown in FIG. 2. Thus, in accordance with various embodiments, a node sequence model of the node sequence generator is trained, using sequences of N nodes, to predict one of the nodes in the sequence, having knowledge of the other N-1 nodes. This is next described.

Figure 4A:
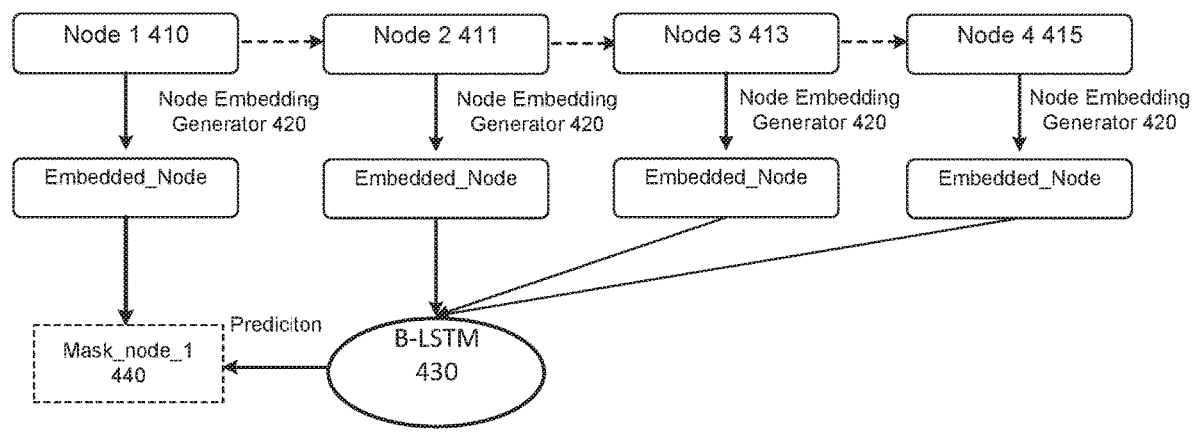
FIG. 4A illustrates an example first stage of training an example node sequence generator, according to one embodiment disclosed herein.
Figure 4B:
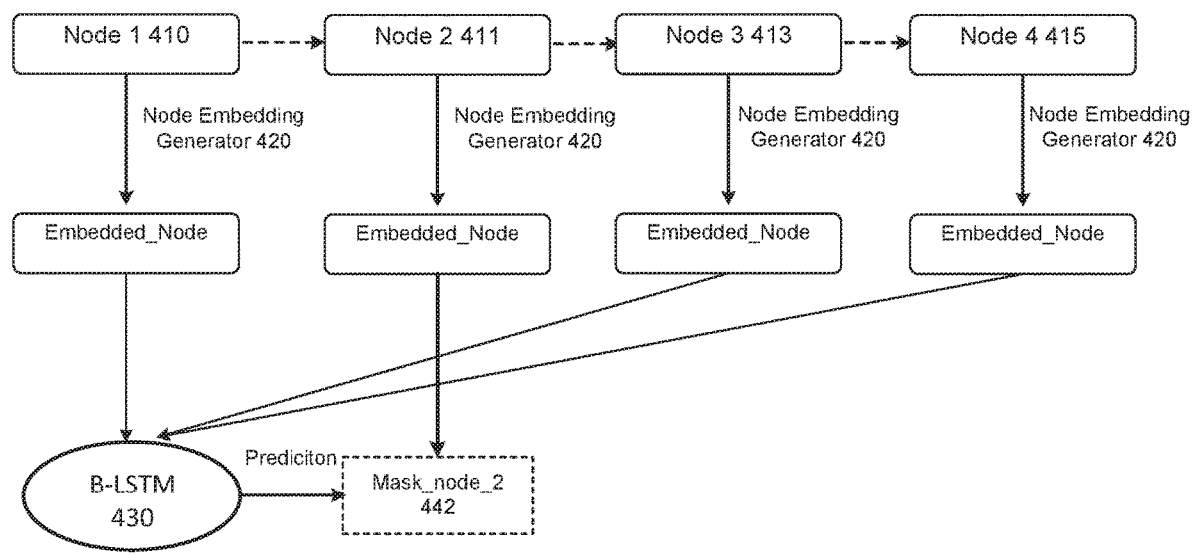
FIG. 4B illustrates an example second stage of training an example node sequence generator, according to one embodiment disclosed herein.

FIG. 4A illustrates an example first stage of training an example node sequence generator, according to one embodiment disclosed herein, and FIG. 4B illustrates an example second stage of the example node sequence generator, according to one embodiment disclosed herein. With reference to FIG. 4A, at the top of the figure are shown a sequence of four nodes, namely Node 1 410, Node 2 411, Node 3 413 and Node 4 415. These represent the various informational components of each respective node, such as (intent, entities, reply). As shown in a second row of the figure, each of these nodes is processed using node embedding techniques illustrated in FIGS. 3A and 3B, by node embedding generator 420, as discussed above, and thus the four nodes 410 through 415 now exist as embedded_nodes, which have the form of vectors, similar to node 350 of FIG. 3B. In FIG. 4A, three of these embedded_nodes, being the last three in the sequence, namely nodes 411, 413 and 415, are provided as inputs to a node sequence model 430. Node sequence model 430, may be, as shown, a B-LSTM neural network. B-LSTM 430 is this trained to predict the masked node in the sequence of nodes, here Mask_node_1 440, which is actually Node 1 410.

The training illustrated in FIG. 4A is known as the Masked Language Model (MLM) method. By masking some nodes randomly, other tokens are used to predict the masked tokens, and in this way the node sequencing model 430 learns to represent the missing node. Unlike other methods, the node sequence generator predicts a masked node instead of an entire input. When a given node in a sequence of nodes is masked, in one or more embodiments, a multi-level mask may be used. For example, in one approach, the specific rules may be as follows for a node to be masked, e.g., Node 1 410:

A: 80% of time, it is replaced by [MASK]node.
B: 10% of time, it is replaced by other actual nodes.
C: 10% of time, it remains the same.

FIG. 4B illustrates a second stage of training of a node sequencing model, and it illustrates the same process as is shown in FIG. 4A, except that now the three inputs to B-LSTM 430 are the first, third and last nodes, namely Node 1 410, Node 3 413 and Node 4 415. The masked node is in the first position of the sequence, and node sequencing model B-LSTM 430 is trained to predict what its values are. By repeating this process and masking each of the four nodes in a separate training run, a model of the node sequencing generator may be trained to recognize how one node flows from another in a multiple-dialogue chat.

Figure 5:
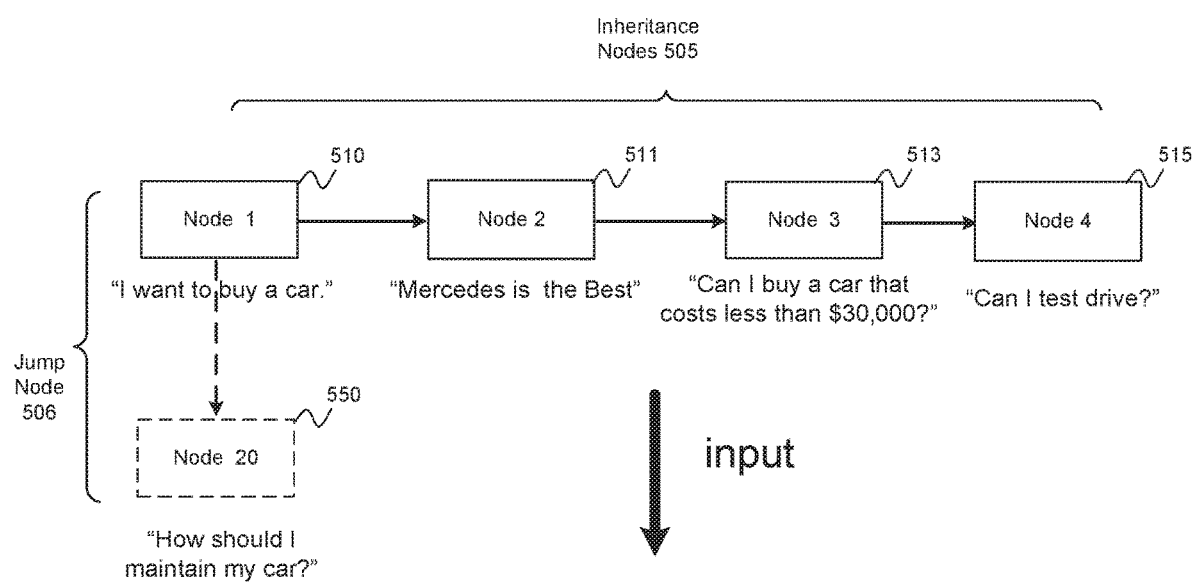
FIG. 5 illustrates an example sequence of nodes that may be input to a node sequence model next node prediction training process, according to one embodiment disclosed herein.

FIG. 5 illustrates a different stage of node sequencing model training, according to various embodiments. In this type of training an example node sequencing model is trained to predict, given a first node, a next node, or a next few steps in an example sequence of nodes, according to one embodiment disclosed herein. It is noted that this "next node prediction" training is most useful given that conversation scenarios often include situations where tasks, e.g., the context of the user input, needs to be changed. These changes of context between successive nodes are often of two types, known as "inheritance" and "jumps." In an inheritance sequence, a child node naturally follows a parent node, and the context is either the same, or, if it has changed, related between them. Thus, for example, at the top of FIG. 5 is shown a four node sequence of inheritance nodes 505, including nodes 510 through 515. Each node in the inheritance sequence naturally follows the one before it, and each node's respective user input is a common one that often appears in automated chats with an online car sales company, or online sales department of an automobile dealership.

The following is an example inheritance sequence using the first two nodes 510 and 511, respectively, of the illustrated example sequence:

node-A: "I want to buy a car"-->node-B: Mercedes is the Best"

After generally informing the chatbot that he or she wishes to purchase a car, the user naturally expresses their preference of automobile type. This is quite natural, and, in general may be easily recognized by a chatbot. This is because a given dealership usually sells only a few brands of cars. So if the user is already in a chat with a dealership that sells Mercedes-Benz automobiles, it is likely that the second node will reference a Mercedes (or one of the other brands that dealership sells). Thus, this inheritance sequence is quite likely, and easy to recognize.

FIG. 5 also illustrates a different type of sequence, in the first column at the left of the figure. As shown, the following is an example jump node sequence 506 using the first node, Node 1 510, and a very different node Node 20 550, respectively:

node-A: "I want to buy a car"--->node-B: "How should I maintain my car?"

Here, we see a jump from the first node, where a user informs the chatbot of his or her intent to purchase a car to a second, related but very different concept, that of maintaining the car. This kind of jump may often occur with a first time buyer, who is excited about purchasing a new car but really does not know anything about car maintenance. Moreover, the only knowledgeable "person" they know is the chatbot at the automobile dealership's website. Accordingly, this sequence is also necessary to recognize, and respond to, when it occurs.

Thus, in one or more embodiments, a second pre-training task will teach a chatbot how to predict the node for the next node and the next few steps, based on the node sequence. In this way, a chatbot may learn the relationship between nodes, and the pattern of inheritance and jump sequences that it may commonly encounter in real world multiple-round chats.

As also shown in FIG. 5, the sequence of nodes 510, 511, 513 and 515 may be used as an input sequence, to train a node sequence generator. FIG. 6 depicts example next node predictions based on example one node and two node inputs, respectively, according to one embodiment disclosed herein. As shown, these may be known as "one parent node" and "two parent node" training, respectively, where the model is trained to accurately predict the next, or "child" node. With reference thereto, at the top of FIG. 6, are four possible two node sequences. The two on the left are correct "next node" sequences, and the two on the right are incorrect "next node sequences", given the four node input sequence of FIG. 5. In each of the four sequences, the node sequence generator is asked to predict if the shown next node is a valid next node, and with what probability.

Similarly, at the bottom of FIG. 6 there are shown rows of two three-node sequences, where the node sequencing model is trained to predict, given the first two nodes Node 1 510 and Node 2 511, what the third node should be. As shown, the top sequence tests a prediction of the correct node, Node 3 513, and the bottom sequence tests a prediction of the wrong node, Node 4 515. As to each, the node sequencing model assigns a probability of the tested third node as being the correct one following the sequence of nodes 1 and 2.

Finally, FIG. 7 depicts an example of next node prediction based on an example three parent node sequence, according to one embodiment disclosed herein. With reference thereto, after correctly learning the sequence of Node 1, Node 2, Node 3 as illustrated in the bottom portion of FIG. 6, now, the chatbot is trained, for example, to predict the fourth and final node in the training sequence, Node 4 115. It is noted that the example node sequencing generator "next node prediction" model training illustrated in FIGS. 5-7, and, for that matter, the "masked node prediction" training in FIGS. 4A and 4B as well, is exemplary and simplified for the purposes of illustration. In an actual chatbot training according to one or more embodiments, a large number of actual nodal sequences would be used, for each of several users, spanning many rounds of multiple-dialogue chats. In one or more embodiments, the training would use domain relevant training data, as is understood.

Figure 8:
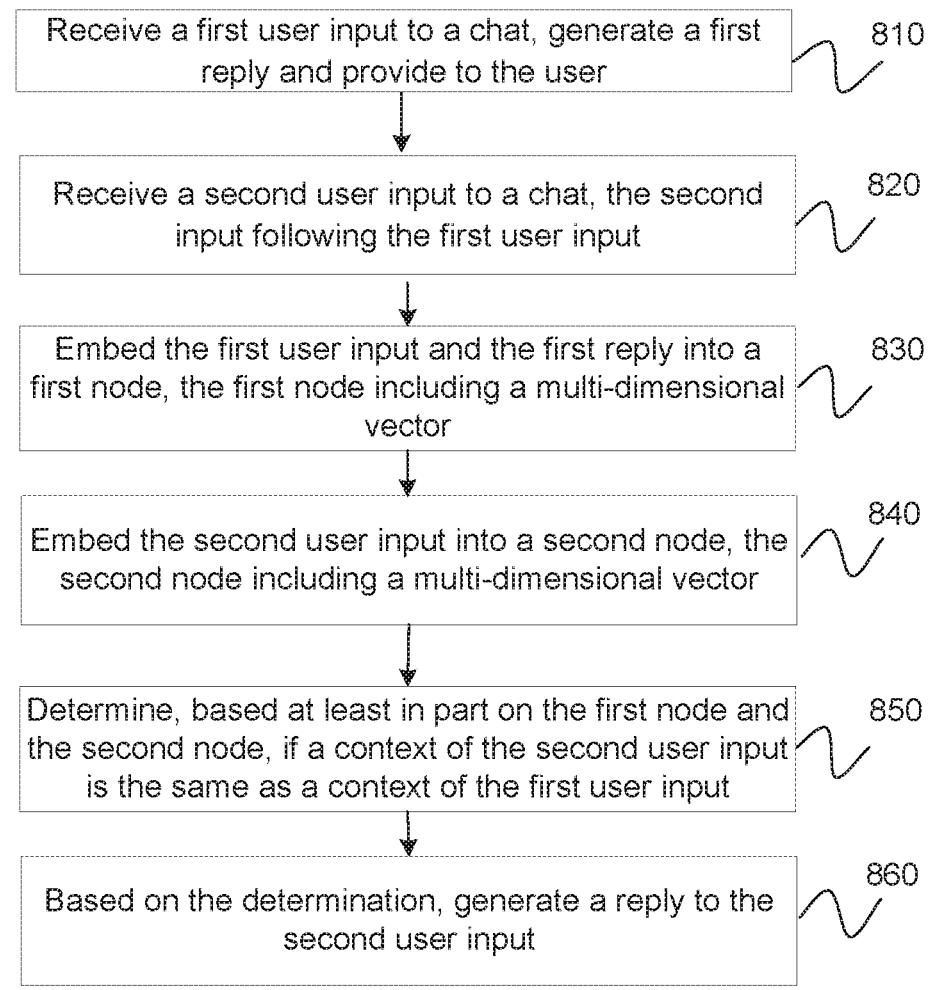
FIG. 8 is a flow chart of an example context managed chat response generation process, according to one embodiment disclosed herein.

FIG. 8 is a flow chart of an example context managed chat response generation process 800, according to one embodiment disclosed herein. The blocks of process 800 reflect tasks performed by, for example, multiple-round dialogue context switching manager 100 shown in FIG. 1. Process 800 includes blocks 810 through 860. In alternate embodiments, process 800 may have greater, or fewer, blocks.

Continuing with reference to FIG. 8, process 800 begins at block 810, where a first user input is received by a chatbot. For example, the first user input may be received by a user interface, such as user interface 107 of FIG. 1, for example, and stored in memory 102 as previous input 110. In response, a reply is generated, and provided to the user via user interface 107. The reply is also stored in memory 102 as part of previous input 110.

From block 810, process 800 moves to block 820, where a second user input is received by the chatbot, the second input received after a reply has been provided, via user interface 107, to the user in response to the first user input, as described above. As was the case for the first user input, the second user input is forwarded to memory 102 and stored as current input 115.

From block 820, process 800 moves to block 830, where the first user input and the first reply are embedded into a first node, the first node including a multi-dimensional vector. For example, the first user input may be parsed by a parser such as parser 121 of FIG. 1, and a node created by node embedding generator 120, using, for example, the process illustrated in FIGS. 3A and 3B. Thus, for example, the first node may have the form of multi-dimensional vector 350 of FIG. 3B.

From block 830, process 800 moves to block 840, where the second user input is also converted, using the process illustrated in FIGS. 3A and 3B, into a second node, the second node including a multi-dimensional vector. Thus, for example, the first node may also have the form of multi-dimensional vector 350 of FIG. 3B, and may or may not include a reply, as noted above.

From block 840, process 800 moves to block 850, where it is determined, based at least in part on the first node and the second node, if a context of the second user input is the same as a context of the first user input. For example, the determination may be made by node sequence generator 125, using one or more predictive models 126, as shown in FIG. 1. The one or more predictive models may be trained, for example, using the two stages of model training illustrated in FIGS. 4A and 4B, and in FIG. 507, respectively.

From block 850, process 800 moves to block 860, where, based on the determination at block 850, a chat reply is generated to the second user input, the chat reply appropriate to the context of the second user input. Process 800 terminates at block 860.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access chatbot applications (e.g., a multiple-round dialogue system, according to embodiments of the present disclosure) or related data available in the cloud. For example, a multiple-round dialogue context switching manager application could execute on a computing system in the cloud and, in response to successive user inputs to the multiple-round dialogue system, determine whether the context has changed between a current user input and a previous user input, and then provide that information to a reply generator, also running in the cloud, to provide the best answer or response to the user input. In such a case, the multiple-round dialogue context switching manager application could receive a set of user inputs to a chat from a remote computing node, for example a chatbot maintained on a website of an automobile dealership. The multiple-round dialogue context switching manager application may then, for example, forward the inputs to a memory at a same or a different location, and provide a reply to the first user input to the chat. When the second or current user input is received, the multiple-round dialogue context switching manager application may forward both inputs to a node embedding generator, which itself may be at a different location, and receive two embedded nodes for each of the previous user input and the current user input, respectively. The multiple-round dialogue context switching manager application may then, using the two nodes, determine if the context has changed between the previous user input and the current user input, and may then forward that information to a reply generator of the multiple-round dialogue system. The reply generator may be co-located on a server with the other elements of the multiple-round dialogue context switching manager application, or it itself may be remote, also in the cloud. The multiple-round dialogue context switching manager application uses at least two sets of predictive models, as described above, and these may be stored in the cloud as well. Finally, a training architecture may also be included in the multiple-round dialogue context switching manager application, and it may access databases of training data including several previous actual chats of the chatbot, and train, offline, the respective sets of deep learning models used in each of the node embedding generator component and the node sequencing generator component of the multiple-round dialogue context switching manager. Thus, interaction with the multiple-round dialogue context switching manager application, either by a user, or by a system administrator performing training of the predictive models, may be initiated from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving a first user input to a chat managed by a multiple-round dialogue system;
generating a first multi-dimensional vector by embedding the first user input into a first node using a first neural network, wherein the first neural network is trained to predict a masked element of a plurality of elements within a training user input;
receiving a second user input to the chat, wherein the second user input follows the first user input;
generating a second multi-dimensional vector by embedding the second user input into a second node using the trained first neural network;
determining, based at least in part on processing the first node and the second node using a second neural network, if a context of the second user input is the same as a context of the first user input, wherein the second neural network is trained to predict a next node based on a given node sequence; and
based on the determination, generating a chat reply to the second user input.

2. The method of claim 1, wherein each user input in the chat includes at least one of a question or a statement.

3. The method of claim 1, wherein each user input in the chat is embedded into a respective node.

4. The method of claim 3, wherein embedding each user input in the chat comprises first performing intent and entity recognition, followed by node embedding.

5. The method of claim 1, further comprising generating a first reply to the first user input.

6. The method of claim 5, further comprising including the first reply in the first node.

7. The method of claim 6, wherein the second node is generated without including a reply to the second user input.

8. The method of claim 1, wherein the first neural network is trained using a masked language model (MLM) method.

9. The method of claim 1, wherein the second neural network is trained using a masked language model (MLM) method.

10. The method of claim 9, wherein the second neural network is further trained to predict whether the second node is one of an inheritance node or a jump node of the first node.

11. A context switching management system for multi-round dialogues, comprising:
  one or more computer processors; and
  a memory containing a program which when executed by the one or more computer processors performs an operation, the operation comprising:
    receiving a first user input to a chat managed by a multiple-round dialogue system;
    generating a first multi-dimensional vector by embedding the first user input into a first node using a first neural network, wherein the first neural network is trained to predict a masked element of a plurality of elements within a training user input;
    receiving a second user input to the chat, wherein the second user input follows the first user input;
    generating a second multi-dimensional vector by embedding the second user input into a second node using the trained first neural network;
    determining based at least in part on processing the first node and the second node using a second neural network, if a context of the second user input is the same as a context of the first user input, wherein the second neural network is trained to predict a next node based on a given node sequence; and
    based on the determination, generating a chat reply to the second user input.

12. The system of claim 11, wherein the memory is configured to store the user inputs and their respective generated replies.

13. The system of claim 11, wherein the first neural network and second neural network are trained using a masked language model (MLM) method, and wherein the second neural network is further trained to predict if the second node is an inheritance node, a jump node, or an unrelated node, of the first node.

14. The system of claim 13, wherein the operation further comprises generating a first reply to the first user input.

15. The system of claim 14, wherein the operation further comprises embedding the first reply, together with the first user input, into the first node.

16. A computer program product for context switching management for multi-round dialogues, the computer program product comprising:
  a computer-readable storage medium having computer-readable program code embodied therewith, the computer-readable program code executable by one or more computer processors to:
    receive a first user input of a multiple-round dialogue;
    generate a first multi-dimensional vector by embedding the first user input into a first node using a first neural network, wherein the first neural network is trained to predict a masked element of a plurality of elements within a training user input;
    receive a second user input of the multiple-round dialogue, wherein the second user input follows the first user input;
    generate a second multi-dimensional vector by embedding the second user input into a second node using the trained first neural network;
    determine, based at least in part on processing the first node and the second node using a second neural network, if a context of the second user input is the same as a context of the first user input, wherein the second neural network is trained to predict a next node based on a given node sequence; and
    based on the determination, generate a reply to the second user input.

17. The computer program product of claim 16, wherein each user input in the chat includes at least one of a question or a statement.

18. The computer program product of claim 16, wherein the computer-readable program code is further executable to, prior to embedding the first user input into the first node, generate a first reply to the first user input.

19. The computer program product of claim 18, wherein the computer-readable program code is further executable to include the first reply in the first node.

20. The computer program product of claim 16, wherein the first neural network and the second neural network are trained using a masked language model (MLM) method.

* * * * *